US012316570B2

(12) United States Patent
Ma et al.

(10) Patent No.: US 12,316,570 B2
(45) Date of Patent: May 27, 2025

(54) QUASI-COLOCATION CONFIGURATION

(71) Applicant: QUALCOMM Incorporated, San Diego, CA (US)

(72) Inventors: Ruifeng Ma, Beijing (CN); Yuwei Ren, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 17/755,906

(22) PCT Filed: Dec. 10, 2020

(86) PCT No.: PCT/CN2020/135114
§ 371 (c)(1),
(2) Date: May 11, 2022

(87) PCT Pub. No.: WO2021/115358
PCT Pub. Date: Jun. 17, 2021

(65) Prior Publication Data
US 2022/0385429 A1 Dec. 1, 2022

(30) Foreign Application Priority Data
Dec. 11, 2019 (WO) ................ PCT/CN2019/124470

(51) Int. Cl.
*H04L 5/00* (2006.01)
(52) U.S. Cl.
CPC .......... *H04L 5/0053* (2013.01); *H04L 5/0048* (2013.01)

(58) Field of Classification Search
None
See application file for complete search history.

(56) References Cited

U.S. PATENT DOCUMENTS

| 11,509,364 | B2 | 11/2022 | Chakraborty et al. |
| 2018/0352533 | A1 | 12/2018 | Islam et al. |
| 2019/0174466 | A1 | 6/2019 | Zhang et al. |
| 2019/0260532 | A1 | 8/2019 | Manolakos et al. |

(Continued)

FOREIGN PATENT DOCUMENTS

| CN | 109391435 A | 2/2019 |
| CN | 109802787 A | 5/2019 |

(Continued)

OTHER PUBLICATIONS

Huawei., et al., "Discussion on Definition of QCL", 3GPP TSG-RAN WG4 Meeting #92bis, R4-1911950 Chongqing, China, Oct. 14-18, 2019, pp. 1-3, Sections 1-3.

(Continued)

*Primary Examiner* — Walter J Divito
(74) *Attorney, Agent, or Firm* — Harrity & Harrity, LLP

(57) ABSTRACT

Various aspects of the present disclosure generally relate to wireless communication. In some aspects, a user equipment may receive configuration information that indicates, for a plurality of signals configured in a symbol, a plurality of quasi-colocation (QCL) relationships to be used for determining a channel property; select a QCL relationship, from (Continued)

the plurality of QCL relationships, to be used for determining the channel property and the plurality of signals in the symbol; and receive the plurality of signals in accordance with the selected QCL relationship based at least in part on the channel property. Numerous other aspects are provided.

30 Claims, 9 Drawing Sheets

(56) References Cited

U.S. PATENT DOCUMENTS

| | | | |
|---|---|---|---|
| 2020/0112355 A1 | 4/2020 | Park et al. | |
| 2021/0127399 A1 | 4/2021 | Kou et al. | |

FOREIGN PATENT DOCUMENTS

| | | |
|---|---|---|
| CN | 110268667 A | 9/2019 |
| CN | 110446269 A | 11/2019 |
| CN | 110475263 A | 11/2019 |
| EP | 3355637 A1 | 8/2018 |
| EP | 3793241 A1 | 3/2021 |
| WO | 2018169635 | 9/2018 |
| WO | WO-2019161181 | 8/2019 |
| WO | WO-2019214665 A1 | 11/2019 |

OTHER PUBLICATIONS

Huawei., et al., "Remaining Issues and TP for QCL Assumptions," 3GPP TSG RAN WG1 Meeting #93, R1-1805961, May 21-25, 2018 (May 25, 2018) the whole document, 6 pages.
International Search Report and Written Opinion—PCT/CN2019/124470—ISA/EPO—Sep. 15, 2020.
International Search Report and Written Opinion—PCT/CN2020/135114—ISA/EPO—Mar. 10, 2021.
ZTE: "QCL/QCB Design for NR MIMO," 3GPP TSG RAN WG1 Meeting #89, R1-1707134, May 15-19, 2017 (May 19, 2017), the whole document, 9 pages.
Supplementary European Search Report—EP20898386—Search Authority—Munich—Dec. 4, 2023.
ZTE., et al., "QCL Design for UL and DL MIMO", 3GPP TSG RAN WG1 Meeting #90 bis, R1-1717437, 3rd Generation Partnership Project, Mobile Competence Centre, 650, Route Des Lucioles, F-06921 Sophia-Antipolis Cedex, France, vol. RAN WG1, No. Prague, CZ, Oct. 9-13, 2017, Oct. 8, 2017, XP051340626, pp. 1-7.

QUASI-COLOCATION CONFIGURATION

CROSS-REFERENCE TO RELATED APPLICATIONS

This Patent Application is a 371 national stage of PCT Application PCT/CN2020/135114 filed on Dec. 10, 2020, entitled "QUASI-COLOCATION CONFIGURATION," which claims priority to PCT Patent Application No. PCT/CN2019/124470, filed on Dec. 11, 2019, entitled "QUASI-COLOCATION CONFIGURATION," which are hereby expressly incorporated by reference herein.

FIELD OF THE DISCLOSURE

Aspects of the present disclosure generally relate to wireless communication and to techniques and apparatuses for quasi-colocation (QCL) configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving configuration information that indicates, for a plurality of signals configured in a symbol, a plurality of quasi-colocation (QCL) relationships to be used for determining a channel property; selecting a QCL relationship, from the plurality of QCL relationships, to be used for determining the channel property and the plurality of signals in the symbol; and receiving the plurality of signals in accordance with the selected QCL relationship based at least in part on the channel property.

In some aspects, a method of wireless communication, performed by a base station, may include selecting a QCL relationship, from a plurality of QCL relationships, to be used for determining a channel property for a plurality of signals in a symbol, wherein the plurality of QCL relationships are associated with the channel property and are configured for the plurality of signals in the symbol; and transmitting the plurality of signals to a UE in accordance with the selected QCL relationship based at least in part on the channel property.

In some aspects, a UE for wireless communication may include memory and one or more processors coupled to the memory. For example, the one or more processors may be operatively, electronically, communicatively, or otherwise coupled to the memory. The memory may include instructions executable by the one or more processors to cause the UE to: receive configuration information that indicates, for a plurality of signals configured in a symbol, a plurality of QCL relationships to be used for determining a channel property; select a QCL relationship, from the plurality of QCL relationships, to be used for determining the channel property and the plurality of signals in the symbol; and receive the plurality of signals in accordance with the selected QCL relationship based at least in part on the channel property.

In some aspects, a base station for wireless communication may include memory and one or more processors coupled to the memory. For example, the one or more processors may be operatively, electronically, communicatively, or otherwise coupled to the memory. The memory may include instructions executable by the one or more processors to cause the base station to: select a QCL relationship, from a plurality of QCL relationships, to be used for determining a channel property for a plurality of signals in a symbol, wherein the plurality of QCL relationships are associated with the channel property and are configured for the plurality of signals in the symbol; and transmit the plurality of signals to a UE in accordance with the selected QCL relationship based at least in part on the channel property.

In some aspects, a non-transitory computer-readable medium may store one or more instructions for wireless communication. The one or more instructions, when executed by one or more processors of a UE, cause the UE to: receive configuration information that indicates, for a plurality of signals configured in a symbol, a plurality of QCL relationships to be used for determining a channel property; select a QCL relationship, from the plurality of QCL relationships, to be used for determining the channel property and the plurality of signals in the symbol; and receive the plurality of signals in accordance with the selected QCL relationship based at least in part on the channel property.

In some aspects, a non-transitory computer-readable medium may store one or more instructions for wireless communication. The one or more instructions, when executed by one or more processors of a base station, cause the base station to: select a QCL relationship, from a plurality of QCL relationships, to be used for determining a channel property for a plurality of signals in a symbol, wherein the plurality of QCL relationships are associated with the channel property and are configured for the plurality of signals in the symbol; and transmit the plurality of signals to a UE in accordance with the selected QCL relationship based at least in part on the channel property.

In some aspects, an apparatus for wireless communication may include means for receiving configuration information that indicates, for a plurality of signals configured in a symbol, a plurality of QCL relationships to be used for determining a channel property; means for selecting a QCL relationship, from the plurality of QCL relationships, to be used for determining the channel property and the plurality of signals in the symbol; and means for receiving the plurality of signals in accordance with the selected QCL relationship based at least in part on the channel property.

In some aspects, an apparatus for wireless communication may include means for selecting a QCL relationship, from a plurality of QCL relationships, to be used for determining a channel property for a plurality of signals in a symbol, wherein the plurality of QCL relationships are associated with the channel property and are configured for the plurality of signals in the symbol; and means for transmitting the plurality of signals to a UE in accordance with the selected QCL relationship based at least in part on the channel property.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
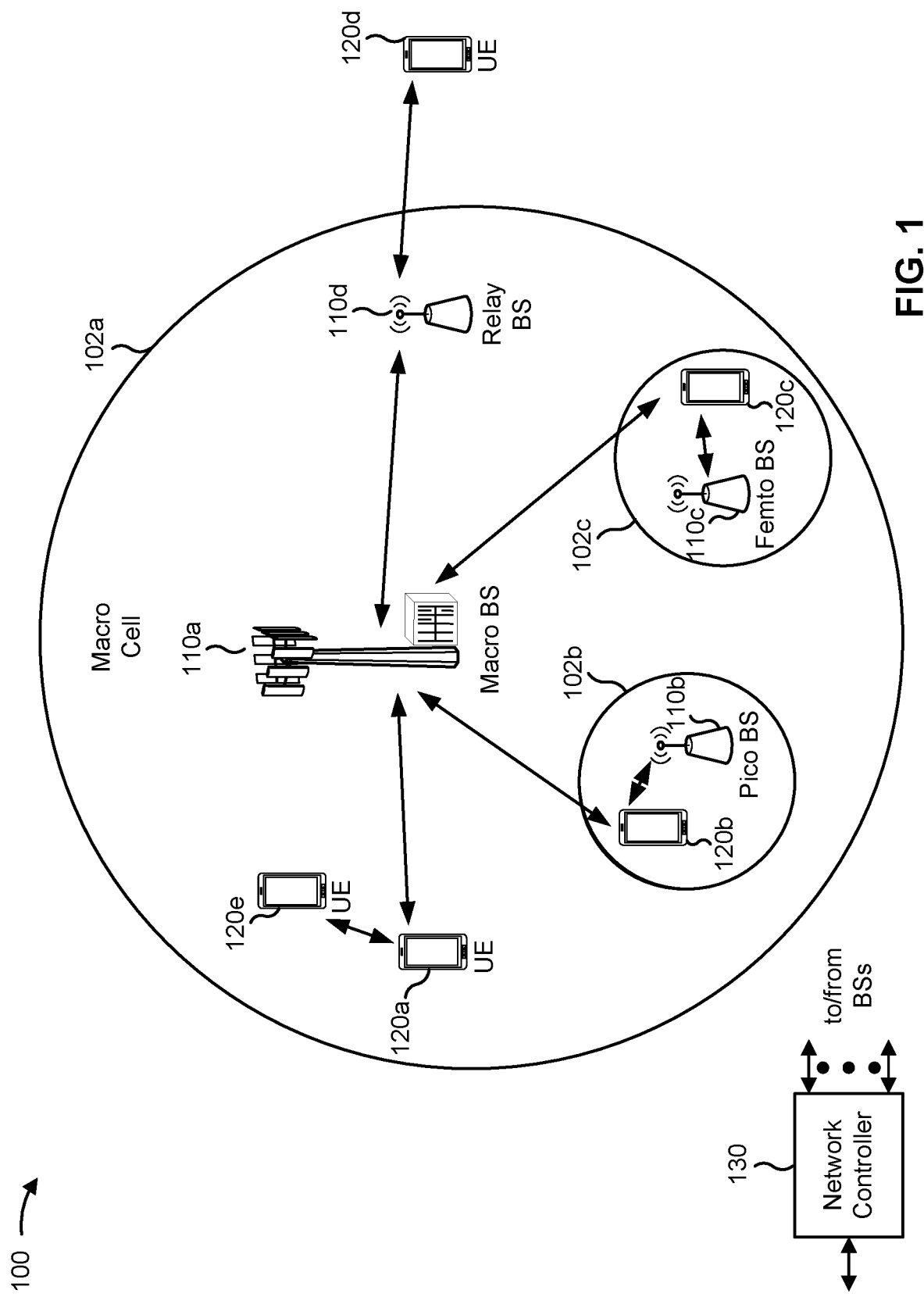
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). Some UEs may be considered low power UEs, low complexity UEs, low cost UEs, or the like. UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
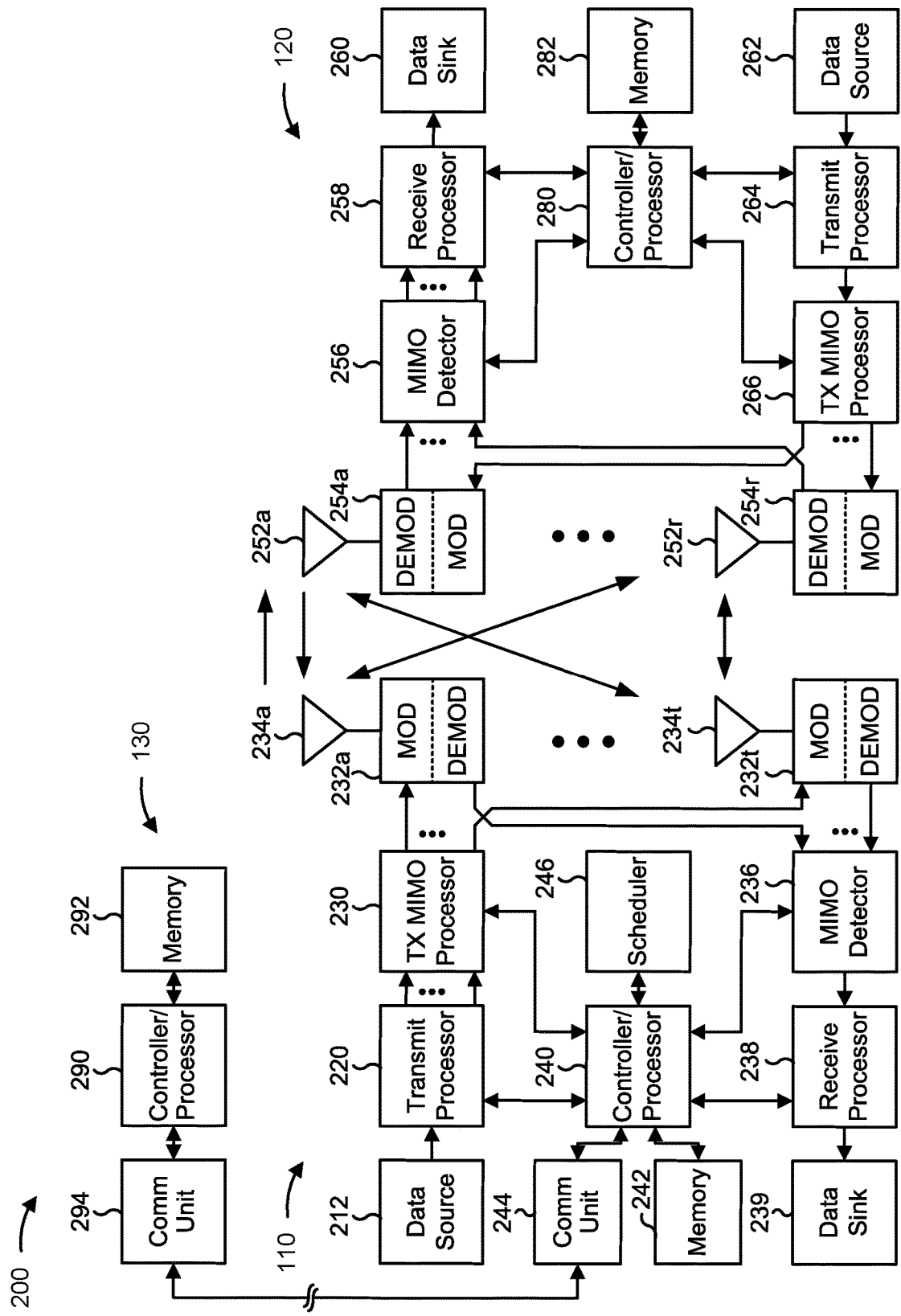
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with quasi-colocation (QCL) configuration, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for receiving configuration information that indicates, for a plurality of signals configured in a symbol, a plurality of QCL relationships to be used for determining a channel property; means for selecting a QCL relationship, from the plurality of QCL relationships, to be used for determining the channel property and the plurality of signals in the symbol; means for receiving the plurality of signals in accordance with the selected QCL relationship based at least in part on the channel property; means for transmitting capability information indicating that: common QCL relationships can be supported for the plurality of signals in a single symbol, common QCL relationships can be supported for the plurality of signals at a granularity of one resource block or a set of resource blocks, or two or more QCL relationships can be supported for the plurality of signals in a single symbol; means for transmitting information indicating a preferred rule for selecting the QCL relationship; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for selecting a QCL relationship, from a plurality of QCL relationships, to be used for determining a channel property for a plurality of signals in a symbol, wherein the plurality of QCL relationships are associated with the channel property and are configured for the plurality of signals in the symbol; means for transmitting the plurality of signals to a UE in accordance with the selected QCL relationship based at least in part on the channel property; means for receiving, from the UE, capability information indicating that: a common QCL relationship can be supported for the plurality of signals in a single symbol, a common QCL relationship can be supported for the plurality of signals at a granularity of one resource block or a set of resource blocks, or two or more QCL relationships can be supported for the plurality of signals in a single symbol; means for receiving information indicating a preferred rule for selecting the QCL relationship; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Quasi-colocation is a concept used to convey information about signals to be wirelessly communicated. A first signal and a second signal are referred to as quasi-colocated (QCLed) if a channel property on a port for the first signal can be inferred from a channel property on the port for the second signal. For example, the first signal may be referred to as being QCLed with the second signal. The channel property may include a Doppler shift, a Doppler spread, an average delay, a delay spread, a spatial reception parameter, or another property. A QCL relationship may define how two signals are QCLed. A QCL relationship can be configured and indicated for various signals, such as a demodulation reference signal of a physical downlink control channel (PDCCH), the demodulation reference signal (DMRS) of a physical downlink shared channel (PDSCH), or a channel state information (CSI) reference signal (RS) (CSI-RS).

A QCL relationship may be configured for an RS by a higher layer, such as a network entity, a BS, and/or the like. The QCL relationship may indicate a QCL source RS and a QCL type. The QCL source RS may be an RS from which the channel property is to be derived. For example, if a first signal is a QCL source RS for a second signal with regard to the channel property of Doppler spread, the second RS's Doppler spread may be determined to be equal or assumed to be equal to the first RS's Doppler spread. A QCL type may identify a group of channel properties for which a QCL relationship is defined between two or more signals. For example, in NR, four QCL types may be defined:
  i. 'QCL-TypeA': {Doppler shift, Doppler spread, average delay, delay spread}
  ii. 'QCL-TypeB': {Doppler shift, Doppler spread}
  iii. 'QCL-TypeC': {Doppler shift, average delay}
  iv. 'QCL-TypeD': {Spatial Rx parameter}.

For the above QCL types, the QCL source RS may be a synchronization signal block (SSB), a CSI-RS, and/or the like.

Some radio access technologies, such as NR, may support multiple QCL types and/or QCL relationships for signals included a single symbol, such as a single OFDM signal. For example, within a single symbol, NR may support two or more QCL relationships of QCL Types A, B, or C, and/or a single QCL relationship of QCL Type D.

A QCL relationship may be indicated to a UE using a transmission configuration indication (TCI) state. For example, the UE may be configured with up to M TCI states, wherein M is based at least in part on a capability of the UE. An information element (e.g., TCI-State and/or the like) may associate one or more downlink RSs with one or more corresponding QCL types.

As mentioned above, NR may support multiple, different QCL types in a single symbol. This may mean that, within a single symbol, multiple reference signals may have different Doppler shift, Doppler spread, average delay, and/or delay spread properties. In this case, the UE may maintain multiple time offsets, frequency offsets, and channel estimators for respective channel properties. For example, if the UE is to track two different Doppler shift values, then the UE may perform two different frequency offset estimation operations. This may consume significant computing resources, and may be difficult or impossible for low complexity, low cost, or low power consumption UEs, such as NR light or reduced capability (RedCap) UEs.

Some techniques and apparatuses described herein provide selection of a QCL relationship for a channel property when two or more different QCL relationships for the channel property are defined in a single symbol. For example, a UE may select a QCL relationship, of a plurality of QCL relationships for a particular channel property, and may use the selected QCL relationship to determine the channel property for one or more reference signals in the symbol. In some aspects, the UE may select respective QCL relationships, from respective pluralities of QCL relationships, for a set of channel properties that are configured with the respective pluralities of QCL relationships in a symbol. Some techniques and apparatuses described herein provide rules, capability signaling, and configuration signaling for the selection of the QCL relationship.

In this way, the complexity of channel property determination when multiple QCL relationships are configured is reduced. This may conserve computing resources and reduce the complexity of channel property determination, thereby simplifying channel property determination for low complexity, low cost, or low power UEs.

Figure 3:
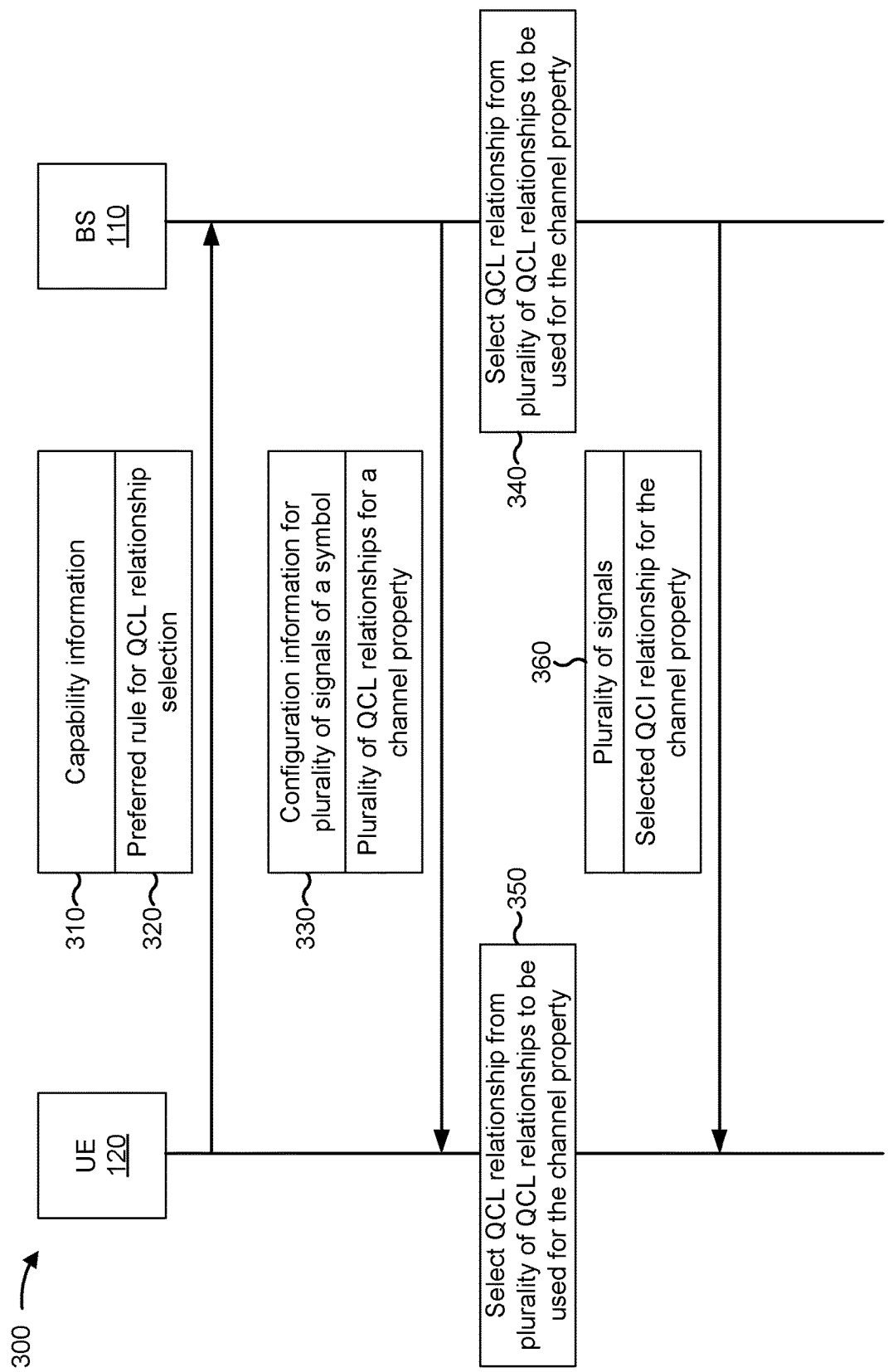
FIG. 3 is a diagram illustrating an example of signaling for configuration and selection of a QCL relationship for a symbol, in accordance with various aspects of the present disclosure.

FIG. 3 is a diagram illustrating an example 300 of signaling for configuration and selection of a QCL relationship for a symbol, in accordance with various aspects of the present disclosure. FIGS. 4-7 are diagrams illustrating examples 400, 500, 600, and 700 of selected QCL relationships for reference signals in a symbol, in accordance with various aspects of the present disclosure. As shown, example 300 includes a UE 120 and a BS 110.

As shown in FIG. 3, and by reference number 310, a UE 120 may provide capability information to a BS 110. The capability information may identify a capability of the UE 120 relating to reception of multiple signals in a single symbol using one or more QCL relationships for one or more channel properties. For example, the UE 120 may signal that the UE 120 supports a single QCL relationship for all signals related to a channel property in a single symbol. In this case, the UE 120 may support respective single QCL relationships for each channel property in the single symbol. In some aspects, the UE 120 may signal that the UE 120 supports a single QCL relationship for multiple signals related to a channel property at a granularity of a resource block or a granularity of a set of resource blocks. In some aspects, the UE 120 may signal that the UE 120 can support two or more different QCL relationships for multiple signals related to each channel property in the same symbol and the same resource block or the same set of resource blocks. The signal may include an RS, such as a DMRS of a PDCCH, a DMRS of a PDSCH, a CSI-RS, and/or the like.

As shown by reference number 320, the UE 120 may provide information indicating a preferred rule for QCL relationship selection. For example, in some aspects, the UE 120 and/or the BS 110 may select a QCL relationship, of a plurality of QCL relationships, to be used for a channel property in a symbol. The UE 120 and/or the BS 110 may perform this selection based at least in part on a rule. The rule may be selected by the UE 120, may be preconfigured for the UE 120, or may be indicated to the UE 120 by the BS 110. In some aspects, the BS 110 may select the rule based at least in part on information, received from the UE 120, that indicates a preferred rule for QCL relationship selection. Examples of such rules are provided elsewhere herein.

In some aspects, the UE 120 may provide capability information (shown by reference number 310) and/or information indicating a preferred rule for QCL relationship selection (shown by reference number 320) that is specific to a QCL type. For example, a UE may have a different capability for QCL relationships of QCL Type A (which includes 4 channel properties) than for QCL Type B or C (which each include 2 channel properties). Thus, the UE 120 may provide capability information or information indicating a preferred rule that is specific to a QCL type, which reduces the likelihood of the UE 120 overreporting or underreporting a capability for a given QCL type. In some aspects, the UE 120 may provide capability information and/or information indicating a preferred rule that is common to all QCL types configurable for the UE 120, which reduces overhead relative to providing such information specifically for a QCL type.

As shown by reference number 330, the BS 110 may provide configuration information to the UE 120. The configuration information may pertain to a plurality of signals of a symbol. For example, the configuration information may indicate a plurality of QCL relationships for one or more channel properties of the plurality of signals of the symbol. In some aspects, the configuration information may identify a QCL source RS and a QCL type for a signal. For example, the configuration information may indicate, for a first signal, a first QCL source RS and a first QCL type, and may indicate, for a second signal, a second QCL source RS and/or a second QCL type different from the first QCL type. In this case, if the first signal and the second signal are in the same symbol, the UE 120 may need to track channel properties corresponding to the first QCL type and the second QCL type for the first QCL source RS and the second QCL source RS, thereby consuming significant computing resources. In such a case, the UE 120 may select respective single QCL relationships for the channel properties tracked by the UE 120 (e.g., one QCL relationship per channel property or multiple QCL relationships for a channel property, as described elsewhere herein), thereby conserving computing resources. The selection of the QCL relationships is described elsewhere herein.

In some aspects, the configuration information may indicate a configuration from a plurality of possible configurations. For example, the configuration information may indicate a selected TCI state configuration for one or more signals. The selected TCI state configuration may indicate a QCL type and a QCL source RS for the one or more signals. For example, the configuration information may include radio resource control (RRC) information, an information element, downlink control information, and/or the like. In some aspects, the configuration information may indicate a rule for selecting a QCL relationship, as described elsewhere herein. For example, a TCI field of the configuration information may indicate the rule. In some aspects, the TCI field may indicate respective rules for a plurality of QCL types.

Some particular examples of configurations of QCL relationships are provided below. Before RRC configuration of a tracking reference signal (TRS) and CSI-RS, for both the sub-6 GHz and super-6 GHz bands, an SSB may be configured as the QCL source RS of the DMRS for the PDSCH with regard to Doppler shift, Doppler spread, average delay, delay spread, and/or spatial reception (RX) parameters. The SSB may be configured as the QCL source RS of the DMRS for the PDCCH with regard to Doppler shift, Doppler spread, average delay, delay spread, and/or spatial RX parameters. After RRC configuration of the TRS and CSI-RS, for sub-6 GHz frequencies and for a single transmit-receive point (TRP), the CSI-RS may be configured as the QCL source RS for the DMRS with regard to Doppler shift, Doppler spread, average delay, and/or delay spread (e.g., QCL Type A). The CSI-RS may be configured as the QCL source RS for the CSI-RS for CSI acquisition with regard to Doppler shift and/or Doppler spread (e.g., QCL Type B). The SSB may be configured as the QCL source RS for the TRS with regard to Doppler shift and/or average delay (e.g., QCL Type C). After RRC configuration and for the super-6 GHz frequency range, the SSB may be used as the as QCL source RS for the CSI-RS for beam management (BM) using QCL types C and D. The SSB may be used as the QCL source RS for the CSI-RS for CSI using QCL type D. The SSB may be used as the QCL source RS for the DMRS for the PDCCH using QCL types A and D. The SSB may be used as the QCL source RS for the DMRS for the PDSCH using QCL types A and D. The CSI-RS for BM may be used as the QCL source reference signal for the DMRS for the PDCCH and the DMRS for the PDSCH using QCL type D. The CSI-RS for CSI may be used as the QCL source RS for the DMRS for the PDSCH using QCL types A and D. The CSI-RS for BM may be used as the QCL source RS for the CSI-RS for TRS/BM/CSI using QCL type D.

As shown by reference numbers 340 and 350, the BS 110 and the UE 120 may select a QCL relationship, from the plurality of QCL relationships, to be used for the channel property. For example, considering a plurality of signals for which respective QCL relationships for determining Doppler spread are configured, the UE 120 and/or the BS 110 may select a QCL relationship, of the respective QCL relationships, to be used to determine Doppler spread for each signal of the plurality of signals (e.g., the same QCL relationship may be used to determine Doppler spread for all signals of the plurality of signals). In some aspects, the UE 120 and the BS 110 may select respective QCL relationships for each channel property for which one or more QCL relationships are configured in the symbol. Thus, the UE 120 and the BS 110 may reduce the complexity of determination of channel properties by reducing the number of QCL relationships to be tracked.

Figure 4:
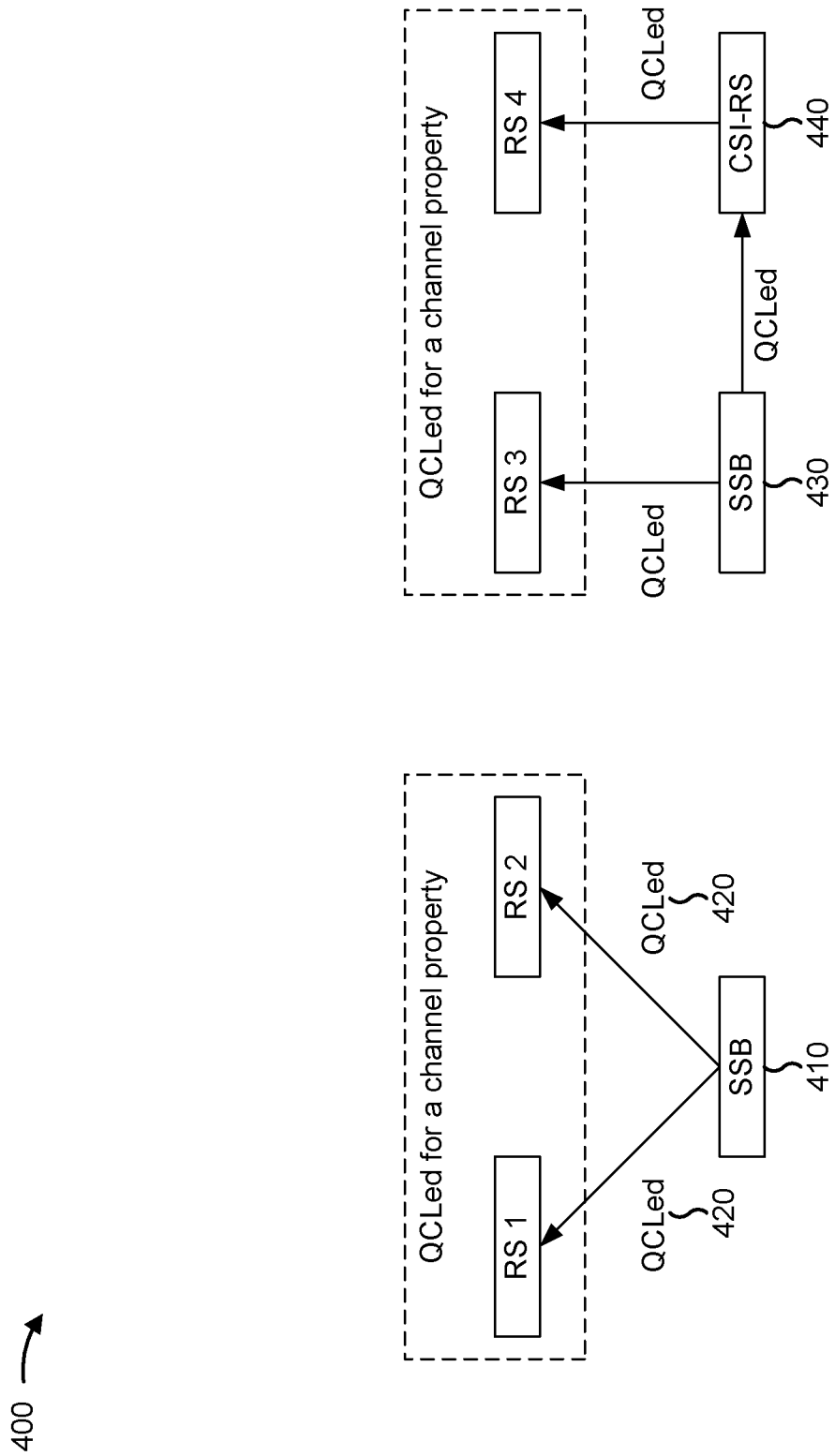
FIGS. 4-7 are diagrams illustrating examples of selected QCL relationships for reference signals in a symbol.

For an example of two or more signals having the same QCL relationship for a channel property, refer to example 400 of FIG. 4. Reference number 410 shows a QCL source RS (e.g., an SSB) for an RS 1 and an RS 2. As shown by reference number 420, RS 1 and RS 2 are QCLed with the SSB with regard to a channel property. Therefore, as indicated by the dotted line around RS 1 and RS 2, RS 1 and RS 2 are QCLed with each other with regard to the channel property, and may be said to have the same QCL relationship for the channel property.

Reference number 430 shows a QCL source RS (e.g., an SSB) for an RS 3 and reference number 440 shows a QCL source RS (e.g., a CSI-RS) for an RS 4. As shown, the SSB and the CSI-RS are QCLed with each other with regard to a channel property. Therefore, RS 3 and RS 4, which are QCLed with the SSB and the CSI-RS, respectively, have a same QCL relationship with regard to the channel property. Thus, RS 3 and RS 4 may be said to have the same QCL relationship for the channel property.

Figure 5:
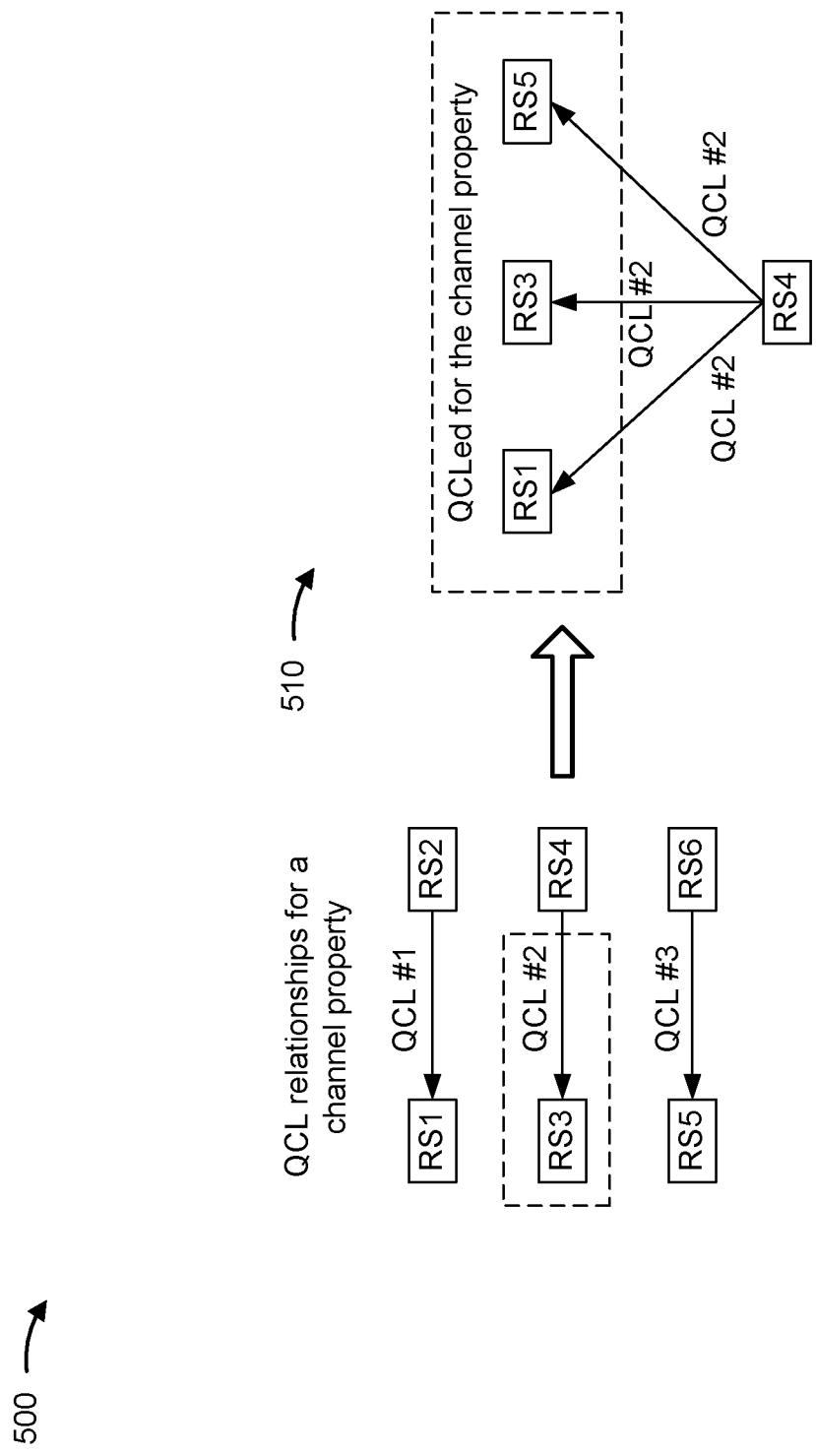
Figure 6:
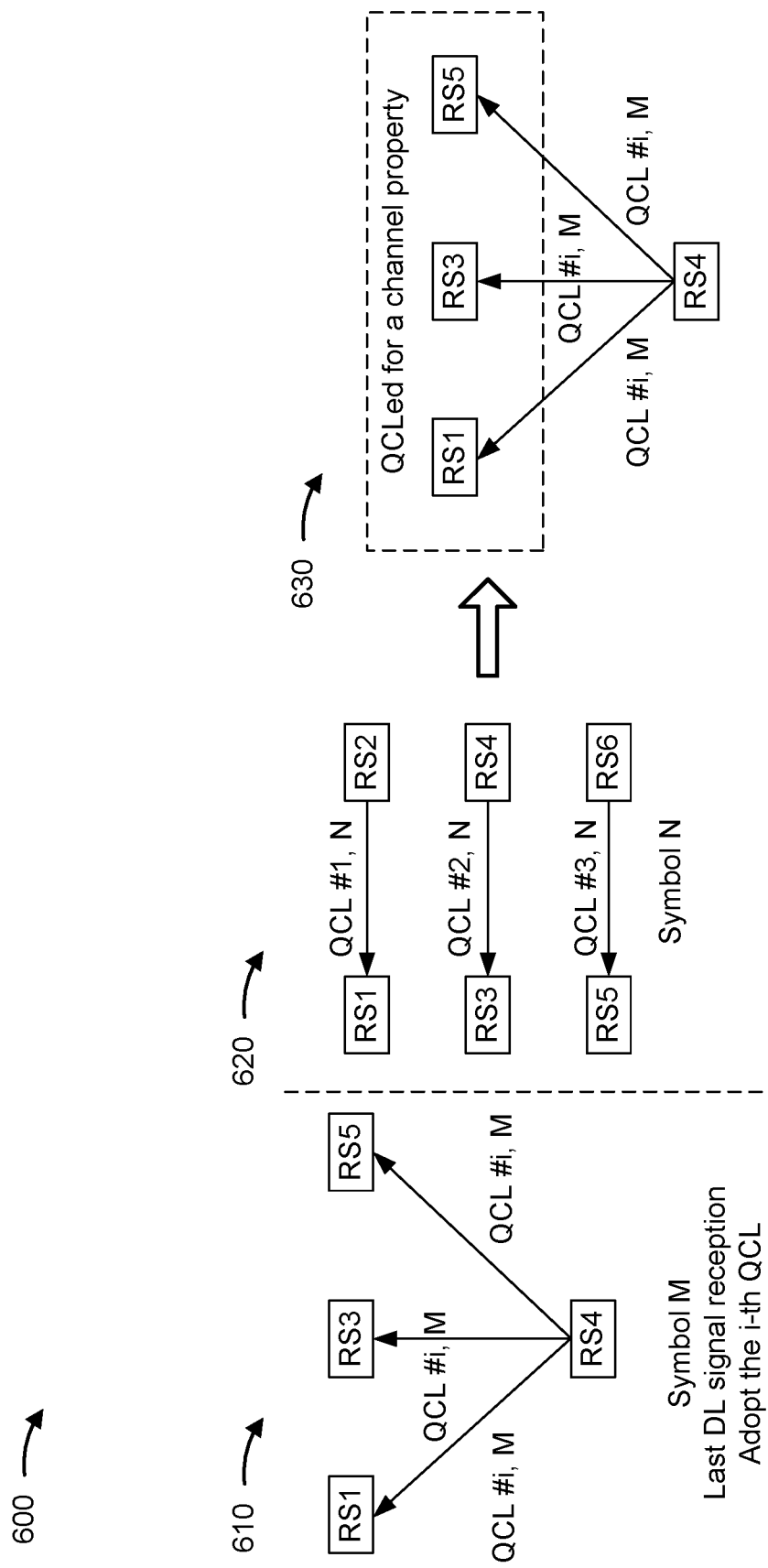

For an example of selecting a QCL relationship to be used for a channel property for a plurality of signals, refer to example 500 of FIG. 5. Example 500 shows RS1 through RS6, which are all to be received by a UE 120 in a same symbol. In example 500, RS2 is configured as a QCL source RS of RS1 (shown as QCL #1), RS4 is configured as a QCL source RS of RS3 (shown as QCL #2), and RS6 is configured as a QCL source RS of RS5 (shown as QCL #3). QCL #1, QCL #2, and QCL #3 are respective QCL relationships relating to the same channel property. If the UE 120 were to use the respective QCL relationships to determine the channel properties for RS1, RS2, and RS3, the UE 120 would consume significant computing resources.

Reference number 510 shows an example of selecting a single QCL relationship (here, QCL #2) to be used for a plurality of signals (RS1, RS3, and RS5) in a symbol. As shown, RS1, RS3, and RS5 may use QCL #2 to determine the channel property associated with QCL #2, thereby conserving computing resources relative to determining channel properties using QCL #1, QCL #2, and QCL #3.

In some aspects, the UE 120 and/or the BS 110 may select the QCL relationship based at least in part on a rule. For example, the rule may indicate a priority or order based at least in part on which to select the QCL relationship. In some aspects, the UE 120 may use the rule to select the QCL relationship. For example, a QCL relationship for a PDCCH may be selected if the DMRS of the PDCCH and the DMRS of the PDSCH have different QCL relationships. As another example, a QCL relationship for a PDCCH may be used if the DMRS of the PDCCH and the CSI-RS have different QCL relationships. As yet another example, a QCL relationship for a PDSCH may be used if the DMRS of the PDSCH and the CSI-RS have different QCL relationships. In some aspects, the BS 110 may configure the UE 120 with an order or rule for selecting the QCL relationship (e.g., using the configuration information or another transmission to the UE 120). For example, referring to example 500, the rule may indicate that RS3 is associated with a highest priority, so QCL #2 may be selected as the QCL relationship that is applied for RS1, RS3, and RS5. In some aspects, the rule may be specific to one or more QCL types. For example, configuration information indicating the rule may indicate a QCL type for which the rule is to be used to select a QCL relationship. In some aspects, the rule may be common to all QCL types that can be configured for the UE 120.

In some aspects, the UE 120 and/or the BS 110 may select the QCL relationship based at least in part on a previously received downlink symbol. For example, refer to example 600 of FIG. 6. Reference number 610 shows a symbol M, which is a last (e.g., most recently received) signal reception of the UE 120. In reference number 610, QCL #i, M (meaning QCL relationship #i from symbol M) is selected as the QCL relationship for RS1, RS3, and RS5. Thus, the UE 120 may determine a channel property for RS1, RS3, and RS5 in accordance with the channel property of RS4. Reference number 620 shows configured QCL relationships for a symbol N (wherein symbol N is received after symbol M). As shown, RS1, RS3, and RS5 are associated with respective QCL relationships QCL to RS2, RS4, and RS6. As shown by reference number 630, the UE 120 may select QCL #i, M for RS1, RS3, and RS5 in symbol N. Thus, the UE 120 may reduce the number of QCL relationships to be tracked.

Figure 7:
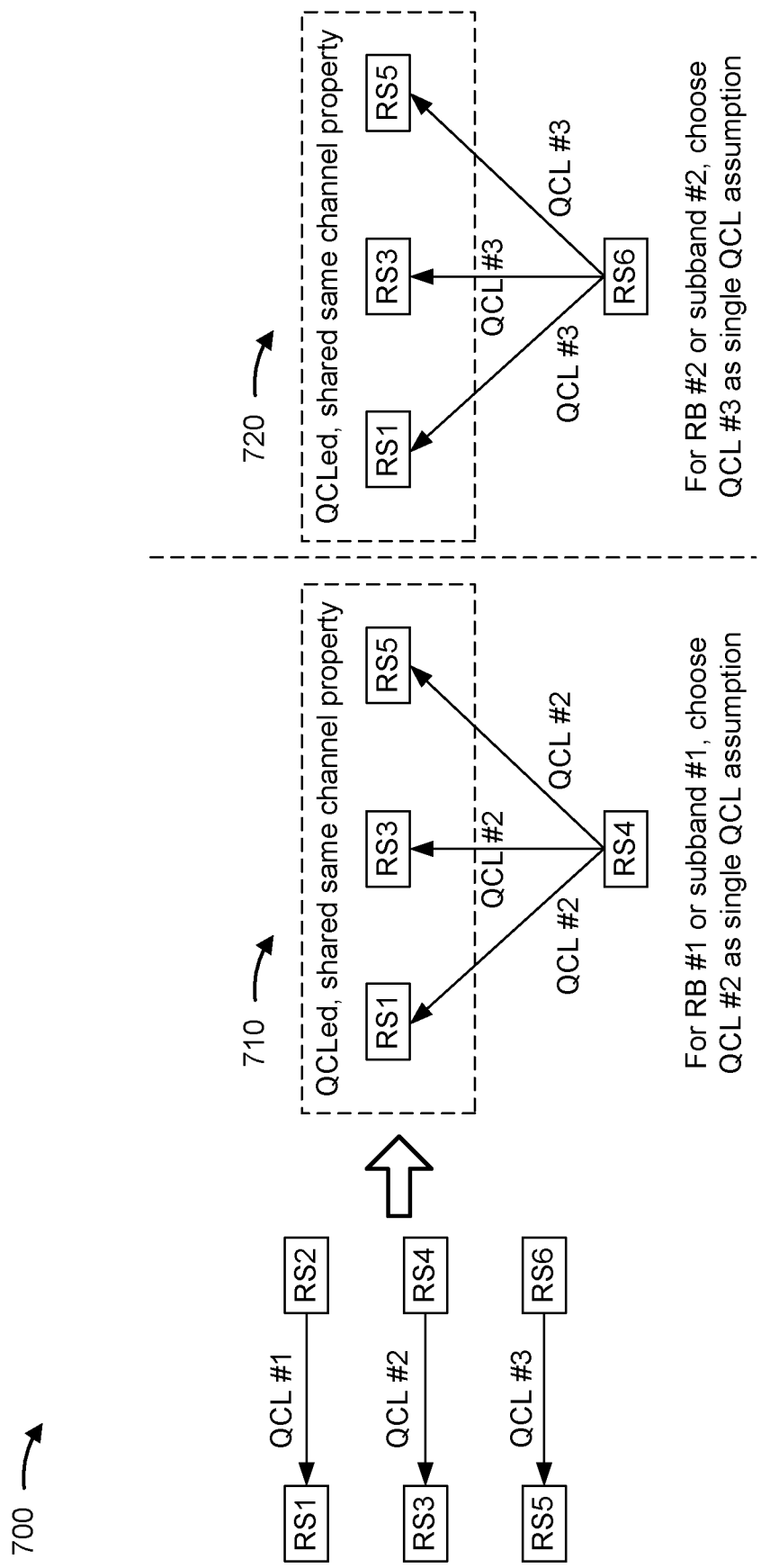

In some aspects, the UE 120 and/or the BS 110 may support two or more different QCL relationships for a plurality of signals with regard to a channel property in a symbol. As a first example, the UE 120 and/or the BS 110 may support a single QCL relationship at a resource block (RB) granularity, where an RB is a number of consecutive frequency resources and time resources (e.g., 12 subcarriers by one or more symbols). In this case, a first QCL relationship may be used for a plurality of signals and a channel property in a first RB, and a second QCL relationship may be used for the plurality of signals and the channel property in a second RB. As a second example, the UE 120 and/or the BS 110 may support a single QCL relationship at an RB set or subband granularity. In this case, a first QCL relationship may be used for a plurality of signals and a channel property in a first RB set or a first subband, and a second QCL relationship may be used for the plurality of signals and the channel property in a second RB set or a second subband. Example 700 of FIG. 7 illustrates an example in which QCL #2 is selected as the QCL relationship for an RB #1 or a subband #1 (shown by reference number 710) and QCL #3 is selected as the QCL relationship for an RB #2 or a subband #2 (shown by reference number 720). In some aspects, an RB gap may be configured between sets of RBs associated with different QCL relationships. An RB gap may comprise one or more RBs in which a PDCCH, a PDSCH, and a CSI-RS are not transmitted. For example, an RB gap may be configured between RB #1 and RB #2 or between subband #1 and subband #2.

In some aspects, the capability information reported by the UE 120 may relate to the number of QCL relationships that can be supported in a symbol. For example, the capability information may indicate that the UE 120 can support a single QCL relationship for all signals and for a channel property in a symbol. As another example, the capability information may indicate that the UE 120 can support two or more different QCL relationships for a plurality of signals and for a channel property in a symbol, and may indicate that the two or more different QCL relationships can be supported at an RB granularity, an RB set granularity, a subband granularity, and/or the like. In this case, the capability information may indicate a size of the RB set or the subband (e.g., a number of RBs or a bandwidth of the subband).

As shown by reference number 360 in FIG. 3, the BS 110 may transmit the plurality of signals to the UE 120 using the selected QCL relationship. For example, the BS 110 may transmit one or more QCL source RSs and the plurality of signals. The UE 120 may determine channel properties of the plurality of signals in accordance with the selected QCL relationship. Thus, the BS 110 and the UE 120 reduce complexity of determining channel properties for signals, thereby conserving computing resources of the UE 120.

As indicated above, FIGS. 3-7 are provided as one or more examples. Other examples may differ from what is described with respect to FIGS. 3-7.

Figure 8:
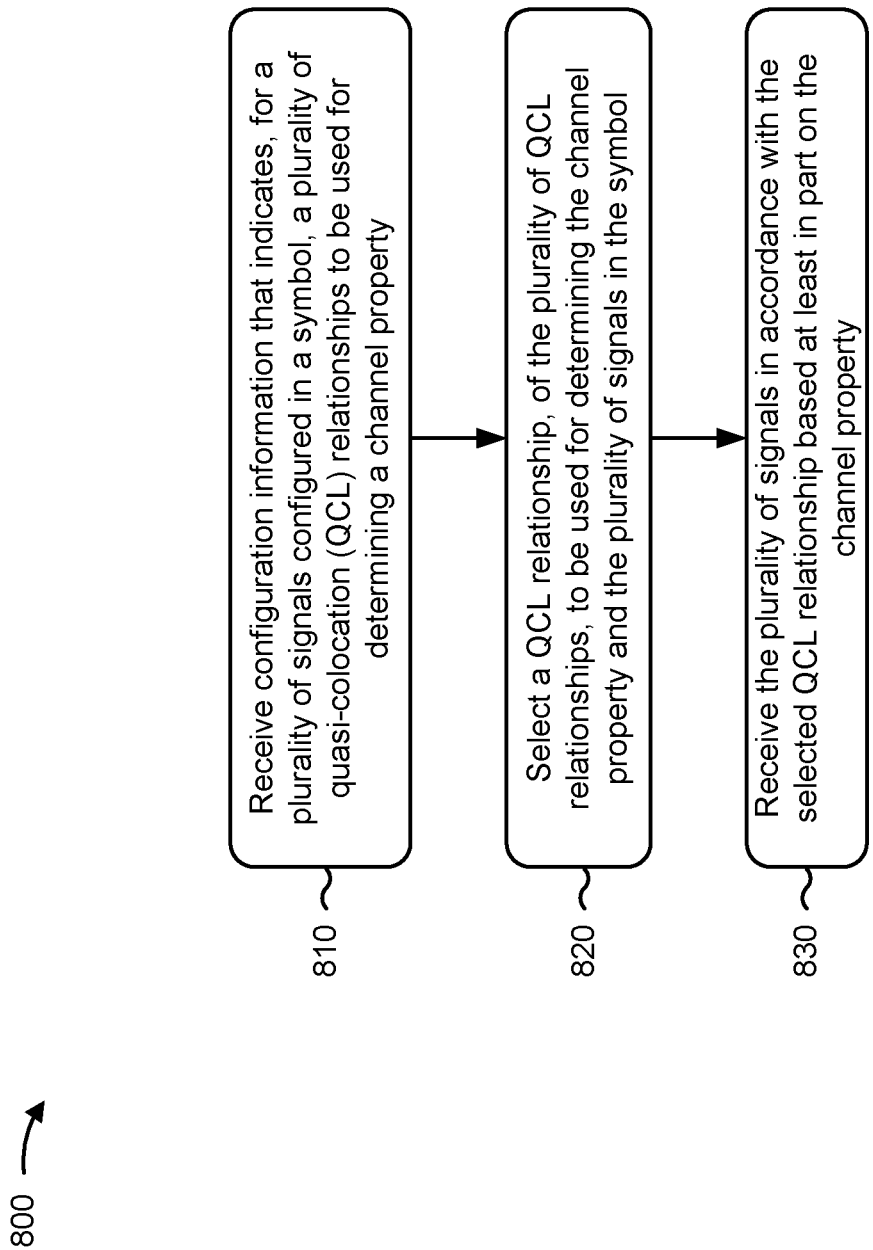
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with quasi-colocation configuration.

As shown in FIG. 8, in some aspects, process 800 may include receiving configuration information that indicates, for a plurality of signals configured in a symbol, a plurality of QCL relationships to be used for determining a channel property (block 810). For example, the UE (e.g., using antenna 252, DEMOD 254, MIMO detector 256, receive processor 258, controller/processor 280, and/or the like) may receive configuration information that indicates, for a plurality of signals configured in a symbol, a plurality of QCL relationships to be used for determining a channel property, as described above.

As further shown in FIG. 8, in some aspects, process 800 may include selecting a QCL relationship, from the plurality of QCL relationships, to be used for determining the channel property and the plurality of signals in the symbol (block 820). For example, the UE (e.g., using controller/processor 280 and/or the like) may select a QCL relationship, from the plurality of QCL relationships, to be used for determining the channel property and the plurality of signals in the symbol, as described above.

As further shown in FIG. 8, in some aspects, process 800 may include receiving the plurality of signals in accordance with the selected QCL relationship based at least in part on the channel property (block 830). For example, the UE (e.g., using antenna 252, DEMOD 254, MIMO detector 256, receive processor 258, controller/processor 280, and/or the like) may receive the plurality of signals in accordance with the selected QCL relationship based at least in part on the channel property, as described above.

Process 800 may include additional aspects, such as any single aspect or any combination of aspects described below and/or in connection with one or more other processes described elsewhere herein.

In a first aspect, the plurality of QCL relationships are between the plurality of signals and two or more QCL source reference signals in the symbol, and selecting the QCL relationship comprises selecting a QCL source reference signal, of the two or more QCL source reference signals, as a selected QCL source reference signal for the selected QCL relationship.

In a second aspect, alone or in combination with the first aspect, each signal, of the plurality of signals, is quasi-colocated with a selected QCL source reference signal, with regard to the channel property, in accordance with the selected QCL relationship, or quasi-colocated with a QCL source reference signal that is quasi-colocated with the selected QCL source reference signal with regard to the channel property.

In a third aspect, alone or in combination with one or more of the first and second aspects, the channel property is one of a set of channel properties associated with a QCL type, and each channel property, of the set of channel properties, is associated with a respective selected QCL relationship.

In a fourth aspect, alone or in combination with one or more of the first through third aspects, selecting the QCL relationship is based at least in part on a rule configured for the UE.

In a fifth aspect, alone or in combination with one or more of the first through fourth aspects, the rule is based at least in part on respective signal types of the plurality of signals or respective signal types of one or more QCL source reference signals of the plurality of signals.

In a sixth aspect, alone or in combination with one or more of the first through fifth aspects, the rule is indicated in a transmission configuration indication (TCI) field of the configuration information.

In a seventh aspect, alone or in combination with one or more of the first through sixth aspects, the TCI field indicates respective rules for a plurality of QCL types.

In an eighth aspect, alone or in combination with one or more of the first through sixth aspects, the TCI field indicates a rule that is common to two or more QCL types.

In a ninth aspect, alone or in combination with one or more of the first through eighth aspects, selecting the QCL relationship is based at least in part on a selected QCL relationship related to the channel property in a previously received downlink symbol.

In a tenth aspect, alone or in combination with one or more of the first through ninth aspects, the selected QCL relationship is a first selected QCL relationship associated with a first resource block or a first set of resource blocks, and a second selected QCL relationship is selected for a second resource block or a second set of resource blocks.

In an eleventh aspect, a resource block gap is configured between the first resource block or first set of resource blocks and the second resource block or second set of resource blocks, based at least in part on the first selected QCL relationship being different than the second selected QCL relationship.

In a twelfth aspect, alone or in combination with one or more of the first through eleventh aspects, process 800 includes transmitting capability information indicating that: common QCL relationships can be supported for the plurality of signals in a single symbol, common QCL relationships can be supported for the plurality of signals at a granularity of one resource block or a set of resource blocks, or two or more QCL relationships can be supported for the plurality of signals in a single symbol.

In a thirteenth aspect, alone or in combination with one or more of the first through twelfth aspects, the capability information is specific to a QCL type.

In a fourteenth aspect, alone or in combination with one or more of the first through thirteenth aspects, the capability information is common to two or more QCL types.

In a fifteenth aspect, alone or in combination with one or more of the first through fourteenth aspects, process 800 includes transmitting information indicating a preferred rule for selecting the QCL relationship.

In a sixteenth aspect, alone or in combination with one or more of the first through fifteenth aspects, the information indicating the preferred rule is specific to a QCL type.

In a seventeenth aspect, alone or in combination with one or more of the first through sixteenth aspects, the information indicating the preferred rule is common to two or more QCL types.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
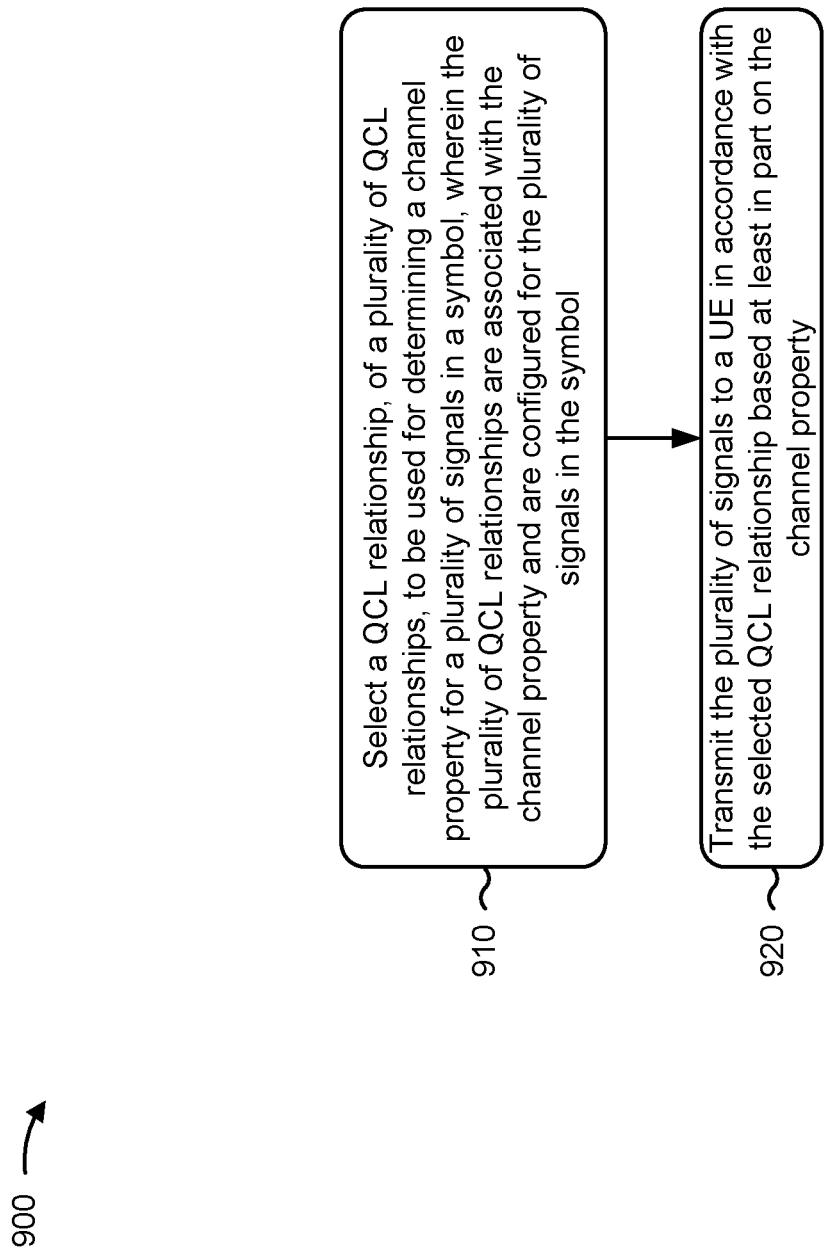
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where the base station (e.g., base station 110 and/or the like) performs operations associated with quasi-colocation configuration.

As shown in FIG. 9, in some aspects, process 900 may include selecting a QCL relationship, from a plurality of QCL relationships, to be used for determining a channel property for a plurality of signals in a symbol, wherein the plurality of QCL relationships are associated with the channel property and are configured for the plurality of signals in the symbol (block 910). For example, the base station (e.g., using controller/processor 240 and/or the like) may select a QCL relationship, from a plurality of QCL relationships, to be used for determining a channel property for a plurality of signals in a symbol, as described above. In some aspects, the plurality of QCL relationships are associated with the channel property and are configured for the plurality of signals in the symbol.

As further shown in FIG. 9, in some aspects, process 900 may include transmitting the plurality of signals to a UE in accordance with the selected QCL relationship based at least in part on the channel property (block 920). For example, the base station (e.g., using controller/processor 240, transmit processor 220, TX MIMO processor 230, MOD 232, antenna 234, and/or the like) may transmit the plurality of signals to a UE in accordance with the selected QCL relationship based at least in part on the channel property, as described above.

Process 900 may include additional aspects, such as any single aspect or any combination of aspects described below and/or in connection with one or more other processes described elsewhere herein.

In a first aspect, the plurality of QCL relationships are between the plurality of signals and two or more QCL source reference signals in the symbol, and selecting the QCL relationship comprises selecting a QCL source reference signal, of the two or more QCL source reference signals, as a selected QCL source reference signal for the selected QCL relationship.

In a second aspect, alone or in combination with the first aspect, each signal, of the plurality of signals, is quasi-colocated with a selected QCL source reference signal, with regard to the channel property, in accordance with the selected QCL relationship, or quasi-colocated with a QCL source reference signal that is quasi-colocated with the selected QCL source reference signal with regard to the channel property.

In a third aspect, alone or in combination with one or more of the first and second aspects, the channel property is one of a set of channel properties associated with a QCL type, and each channel property, of the set of channel properties, is associated with a respective selected QCL relationship.

In a fourth aspect, alone or in combination with one or more of the first through third aspects, selecting the QCL relationship is based at least in part on a rule configured for the UE.

In a fifth aspect, alone or in combination with one or more of the first through fourth aspects, the rule is based at least in part on respective signal types of the plurality of signals or respective signal types of one or more QCL source reference signals of the plurality of signals.

In a sixth aspect, alone or in combination with one or more of the first through fifth aspects, the rule is indicated in a TCI field of configuration information transmitted by the base station.

In a seventh aspect, alone or in combination with one or more of the first through sixth aspects, the TCI field indicates respective rules for a plurality of QCL types.

In an eighth aspect, alone or in combination with one or more of the first through seventh aspects, the TCI field indicates a rule that is common to two or more QCL types.

In a ninth aspect, alone or in combination with one or more of the first through eighth aspects, selecting the QCL relationship related to the channel property is based at least in part on a selected QCL relationship in a previously received downlink symbol.

In a tenth aspect, alone or in combination with one or more of the first through ninth aspects, the selected QCL relationship is a first selected QCL relationship associated with a first resource block or a first set of resource blocks, and a second selected QCL relationship is selected for a second resource block or a second set of resource blocks.

In an eleventh aspect, alone or in combination with one or more of the first through tenth aspects, a resource block gap is provided between the first resource block or first set of resource blocks and the second resource block or second set of resource blocks, based at least in part on the first selected QCL relationship being different than the second selected QCL relationship.

In a twelfth aspect, alone or in combination with one or more of the first through eleventh aspects, process 900 includes receiving, from the UE, capability information indicating that: a common QCL relationship can be supported for the plurality of signals in a single symbol, a common QCL relationship can be supported for the plurality of signals at a granularity of one resource block or a set of resource blocks, or two or more QCL relationships can be supported for the plurality of signals in a single symbol.

In a thirteenth aspect, alone or in combination with one or more of the first through twelfth aspects, the capability information is specific to a QCL type.

In a fourteenth aspect, alone or in combination with one or more of the first through thirteenth aspects, the capability information is common to two or more QCL types.

In a fifteenth aspect, alone or in combination with one or more of the first through fourteenth aspects, process 900 includes receiving information indicating a preferred rule for selecting the QCL relationship.

In a sixteenth aspect, alone or in combination with one or more of the first through fifteenth aspects, the information indicating the preferred rule is specific to a QCL type.

In a seventeenth aspect, alone or in combination with one or more of the first through sixteenth aspects, the information indicating the preferred rule is common to two or more QCL types.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some aspects of the present disclosure:

Aspect 1: A method of wireless communication performed by a user equipment (UE), comprising: receiving configuration information that indicates, for a plurality of signals configured in a symbol, a plurality of quasi-colocation (QCL) relationships to be used for determining a channel property; selecting a QCL relationship, from the plurality of QCL relationships, to be used for determining the channel property and the plurality of signals in the symbol; and receiving the plurality of signals in accordance with the selected QCL relationship based at least in part on the channel property.

Aspect 2: The method of aspect 1, wherein the plurality of QCL relationships are between the plurality of signals and two or more QCL source reference signals in the symbol, and wherein selecting the QCL relationship comprises selecting a QCL source reference signal, of the two or more QCL source reference signals, as a selected QCL source reference signal for the selected QCL relationship.

Aspect 3: The method of any of aspects 1-2, wherein each signal, of the plurality of signals, is: quasi-colocated with a selected QCL source reference signal, with regard to the channel property, in accordance with the selected QCL relationship, or quasi-colocated with a QCL source reference signal that is quasi-colocated with the selected QCL source reference signal with regard to the channel property.

Aspect 4: The method of any of aspects 1-3, wherein the channel property is one of a set of channel properties associated with a QCL type, and wherein each channel property, of the set of channel properties, is associated with a respective selected QCL relationship.

Aspect 5: The method of any of aspects 1-4, wherein selecting the QCL relationship is based at least in part on a rule configured for the UE.

Aspect 6: The method of aspect 5, wherein the rule is based at least in part on respective signal types of the plurality of signals or respective signal types of one or more QCL source reference signals of the plurality of signals.

Aspect 7: The method of aspect 5, wherein the rule is indicated in a transmission configuration indication (TCI) field of the configuration information.

Aspect 8: The method of aspect 7, wherein the TCI field indicates respective rules for a plurality of QCL types.

Aspect 9: The method of aspect 7, wherein the TCI field indicates a rule that is common to two or more QCL types.

Aspect 10: The method of any of aspects 1-9, wherein selecting the QCL relationship is based at least in part on a selected QCL relationship related to the channel property in a previously received downlink symbol.

Aspect 11: The method of any of aspects 1-10, wherein the selected QCL relationship is a first selected QCL relationship associated with a first resource block or a first set of resource blocks, and wherein a second selected QCL relationship is selected for a second resource block or a second set of resource blocks.

Aspect 12: The method of aspect 11, wherein a resource block gap is configured between the first resource block or first set of resource blocks and the second resource block or second set of resource blocks, based at least in part on the first selected QCL relationship being different than the second selected QCL relationship.

Aspect 13: The method of any of aspects 1-12, further comprising: transmitting capability information indicating that: common QCL relationships can be supported for the plurality of signals in a single symbol, common QCL relationships can be supported for the plurality of signals at a granularity of one resource block or a set of resource blocks, or two or more QCL relationships can be supported for the plurality of signals in a single symbol.

Aspect 14: The method of aspect 13, wherein the capability information is specific to a QCL type.

Aspect 15: The method of aspect 13, wherein the capability information is common to two or more QCL types.

Aspect 16: The method of any of aspects 1-15, further comprising: transmitting information indicating a preferred rule for selecting the QCL relationship.

Aspect 17: The method of aspect 16, wherein the information indicating the preferred rule is specific to a QCL type.

Aspect 18: The method of aspect 16, wherein the information indicating the preferred rule is common to two or more QCL types.

Aspect 19: A method of wireless communication performed by a base station, comprising: selecting a quasi-colocation (QCL) relationship, from a plurality of QCL relationships, to be used for determining a channel property for a plurality of signals in a symbol, wherein the plurality of QCL relationships are associated with the channel property and are configured for the plurality of signals in the symbol; and transmitting the plurality of signals to a user equipment (UE) in accordance with the selected QCL relationship based at least in part on the channel property.

Aspect 20: The method of aspect 19, wherein the plurality of QCL relationships are between the plurality of signals and two or more QCL source reference signals in the symbol, and wherein selecting the QCL relationship comprises selecting a QCL source reference signal, of the two or more QCL source reference signals, as a selected QCL source reference signal for the selected QCL relationship.

Aspect 21: The method of any of aspects 19-20, wherein each signal, of the plurality of signals, is: quasi-colocated with a selected QCL source reference signal, with regard to the channel property, in accordance with the selected QCL relationship, or quasi-colocated with a QCL source reference signal that is quasi-colocated with the selected QCL source reference signal with regard to the channel property.

Aspect 22: The method of any of aspects 19-21, wherein the channel property is one of a set of channel properties associated with a QCL type, and wherein each channel property, of the set of channel properties, is associated with a respective selected QCL relationship.

Aspect 23: The method of any of aspects 19-22, wherein selecting the QCL relationship is based at least in part on a rule configured for the UE.

Aspect 24: The method of any of aspects 19-23, wherein selecting the QCL relationship related to the channel property is based at least in part on a selected QCL relationship in a previously received downlink symbol.

Aspect 25: The method of any of aspects 19-24, wherein the selected QCL relationship is a first selected QCL relationship associated with a first resource block or a first set of resource blocks, and wherein a second selected QCL relationship is selected for a second resource block or a second set of resource blocks.

Aspect 26: The method of aspect 25, wherein a resource block gap is provided between the first resource block or first set of resource blocks and the second resource block or second set of resource blocks, based at least in part on the first selected QCL relationship being different than the second selected QCL relationship.

Aspect 27: The method of any of aspects 19-26, further comprising: receiving, from the UE, capability information indicating that: a common QCL relationship can be supported for the plurality of signals in a single symbol, a common QCL relationship can be supported for the plurality of signals at a granularity of one resource block or a set of resource blocks, or two or more QCL relationships can be supported for the plurality of signals in a single symbol.

Aspect 28: The method of any of aspects 19-27, further comprising: receiving information indicating a preferred rule for selecting the QCL relationship.

Aspect 29: An apparatus for wireless communication at a device, comprising a processor; memory coupled with the processor; and instructions stored in the memory and executable by the processor to cause the apparatus to perform the method of one or more aspects of aspects 1-28.

Aspect 30: A device for wireless communication, comprising a memory and one or more processors coupled to the memory, the memory and the one or more processors configured to perform the method of one or more aspects of aspects 1-28.

Aspect 31: An apparatus for wireless communication, comprising at least one means for performing the method of one or more aspects of aspects 1-28.

Aspect 32: A non-transitory computer-readable medium storing code for wireless communication, the code comprising instructions executable by a processor to perform the method of one or more aspects of aspects 1-28.

Aspect 33: A non-transitory computer-readable medium storing a set of instructions for wireless communication, the set of instructions comprising one or more instructions that, when executed by one or more processors of a device, cause the device to perform the method of one or more aspects of aspects 1-28.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware and/or a combination of hardware and software. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, software, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (ULE), comprising:
   receiving configuration information that indicates, for a plurality of signals configured in a symbol, a plurality of quasi-colocation (QCL) relationships to be used for determining a channel property;
   selecting a single QCL relationship, from the plurality of QCL relationships, to be used to determine the channel property for the plurality of signals in the symbol; and
   receiving the plurality of signals in accordance with the selected QCL relationship based at least in part on the channel property.

2. The method of claim 1, wherein the plurality of QCL relationships are between the plurality of signals and two or more QCL source reference signals in the symbol, and wherein selecting the QCL relationship comprises selecting a QCL source reference signal, of the two or more QCL source reference signals, as a selected QCL source reference signal for the selected QCL relationship.

3. The method of claim 1, wherein each signal, of the plurality of signals, is:
   quasi-colocated with a selected QCL source reference signal, with regard to the channel property, in accordance with the selected QCL relationship, or quasi-colocated with a QCL source reference signal that is quasi-colocated with the selected QCL source reference signal with regard to the channel property.

4. The method of claim 1, wherein the channel property is one of a set of channel properties associated with a QCL type, and wherein each channel property, of the set of channel properties, is associated with a respective selected QCL relationship.

5. The method of claim 1, wherein selecting the QCL relationship is based at least in part on a rule configured for the UE.

6. The method of claim 5, wherein the rule is based at least in part on respective signal types of the plurality of signals or respective signal types of one or more QCL source reference signals of the plurality of signals.

7. The method of claim 5, wherein the rule is indicated in a transmission configuration indication (TCI) field of the configuration information.

8. The method of claim 7, wherein the TCI field indicates respective rules for a plurality of QCL types.

9. The method of claim 7, wherein the TCI field indicates a rule that is common to two or more QCL types.

10. The method of claim 1, wherein selecting the QCL relationship is based at least in part on a selected QCL relationship related to the channel property in a previously received downlink symbol.

11. The method of claim 1, wherein the selected QCL relationship is a first selected QCL relationship associated with a first resource block or a first set of resource blocks, and wherein a second selected QCL relationship is selected for a second resource block or a second set of resource blocks.

12. The method of claim 11, wherein a resource block gap is configured between the first resource block or first set of resource blocks and the second resource block or second set of resource blocks, based at least in part on the first selected QCL relationship being different than the second selected QCL relationship.

13. The method of claim 1, further comprising:
transmitting capability information indicating that:
common QCL relationships can be supported for the plurality of signals in a single symbol, common QCL relationships can be supported for the plurality of signals at a granularity of one resource block or a set of resource blocks, or
two or more QCL relationships can be supported for the plurality of signals in a single symbol.

14. The method of claim 13, wherein the capability information is specific to a QCL type.

15. The method of claim 13, wherein the capability information is common to two or more QCL types.

16. The method of claim 1, further comprising:
transmitting information indicating a preferred rule for selecting the QCL relationship.

17. The method of claim 16, wherein the information indicating the preferred rule is specific to a QCL type.

18. The method of claim 16, wherein the information indicating the preferred rule is common to two or more QCL types.

19. A method of wireless communication performed by a base station, comprising:
transmitting configuration information that indicates, for a plurality of signals configured in a symbol, a plurality of quasi-colocation (QCL) relationships to be used for determining a channel property;
selecting a single QCL relationship, from the plurality of QCL relationships, to be used to determine the channel property for the plurality of signals in the symbol; and
transmitting the plurality of signals to a user equipment (UE) in accordance with the selected QCL relationship based at least in part on the channel property.

20. The method of claim 19, wherein the plurality of QCL relationships are between the plurality of signals and two or more QCL source reference signals in the symbol, and wherein selecting the QCL relationship comprises selecting a QCL source reference signal, of the two or more QCL source reference signals, as a selected QCL source reference signal for the selected QCL relationship.

21. The method of claim 19, wherein each signal, of the plurality of signals, is:
quasi-colocated with a selected QCL source reference signal, with regard to the channel property, in accordance with the selected QCL relationship, or
quasi-colocated with a QCL source reference signal that is quasi-colocated with the selected QCL source reference signal with regard to the channel property.

22. The method of claim 19, wherein the channel property is one of a set of channel properties associated with a QCL type, and wherein each channel property, of the set of channel properties, is associated with a respective selected QCL relationship.

23. The method of claim 19, wherein selecting the QCL relationship is based at least in part on a rule configured for the UE.

24. The method of claim 19, wherein selecting the QCL relationship related to the channel property is based at least in part on a selected QCL relationship in a previously received downlink symbol.

25. The method of claim 19, wherein the selected QCL relationship is a first selected QCL relationship associated with a first resource block or a first set of resource blocks, and wherein a second selected QCL relationship is selected for a second resource block or a second set of resource blocks.

26. The method of claim 25, wherein a resource block gap is provided between the first resource block or first set of resource blocks and the second resource block or second set of resource blocks, based at least in part on the first selected QCL relationship being different than the second selected QCL relationship.

27. The method of claim 19, further comprising:
receiving, from the UE, capability information indicating that:
a common QCL relationship can be supported for the plurality of signals in a single symbol, a common QCL relationship can be supported for the plurality of signals at a granularity of one resource block or a set of resource blocks, or
two or more QCL relationships can be supported for the plurality of signals in a single symbol.

28. The method of claim 19, further comprising:
receiving information indicating a preferred rule for selecting the QCL relationship.

29. A user equipment (UE) for wireless communication, comprising:
one or more memories; and
one or more processors coupled to the one or more memories, the one or more memories storing instructions configurable to be executed by the one or more processors to cause the UE to:
receive configuration information that indicates, for a plurality of signals configured in a symbol, a plurality of quasi-colocation (QCL) relationships to be used for determining a channel property;

select a single QCL relationship, from the plurality of QCL relationships, to be used to determine the channel property for the plurality of signals in the symbol; and receive the plurality of signals in accordance with the selected QCL relationship based at least in part on the channel property.

30. A base station for wireless communication, comprising:

one or more memories; and one or more processors coupled to the one or more memories, the one or more memories storing instructions configurable to be executed by the one or more processors to cause the base station to:

transmit configuration information that indicates, for a plurality of signals configured in a symbol, a plurality of quasi-colocation (QCL) relationships to be used for determining a channel property;

select a single QCL relationship, from the plurality of QCL relationships, to be used to determine the channel property for the plurality of signals in the symbol; and transmit the plurality of signals to a user equipment (UE) in accordance with the selected QCL relationship based at least in part on the channel property.

* * * * *